No. 878,486. PATENTED FEB. 4, 1908.
L. H. CROWELL, DEC'D.
E. R. & M. O. CROWELL, EXECUTORS.
TOOTH BRUSH.
APPLICATION FILED JAN. 24, 1906.
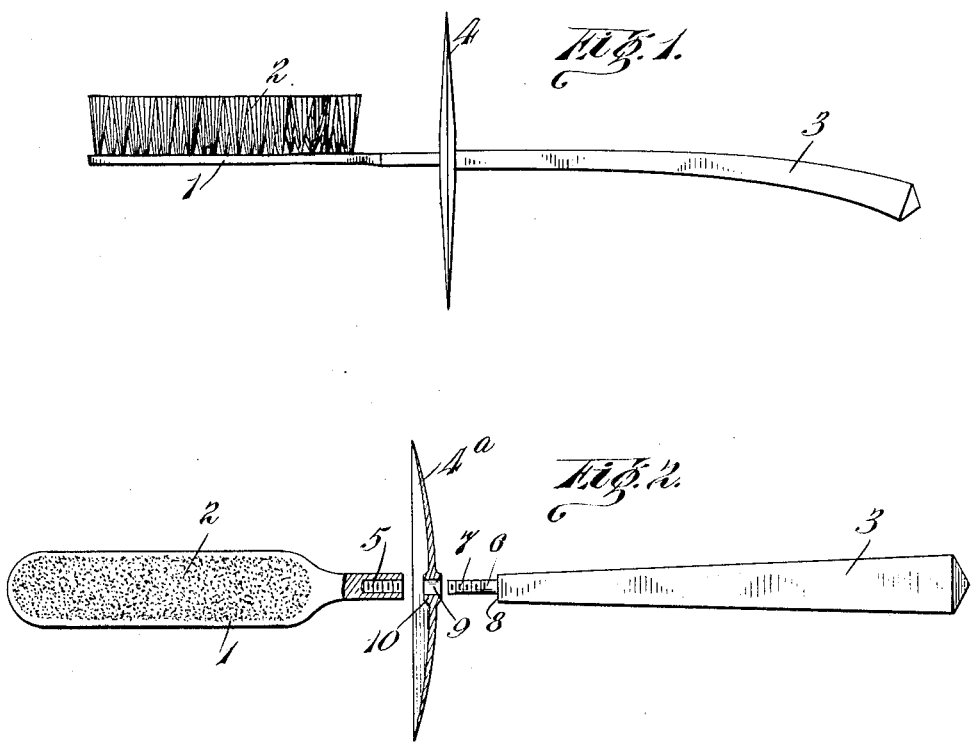
Witnesses:
Jovitt H. Crowell
Inventor,
By Marion & Marion
Attorneys

UNITED STATES PATENT OFFICE.

LOVITT HAVELOCK CROWELL, OF HALIFAX, NOVA SCOTIA, CANADA; EDITH RAY CROWELL AND MAURICE OSBORNE CROWELL EXECUTORS OF SAID LOVITT HAVELOCK CROWELL, DECEASED.

TOOTH-BRUSH.

No. 878,486.      Specification of Letters Patent.      Patented Feb. 4, 1908.

Application filed January 24, 1906. Serial No. 297,555.

*To all whom it may concern:*

Be it known that I, LOVITT HAVELOCK CROWELL, a subject of the King of Great Britain, residing at Halifax, county of Halifax, in the Province of Nova Scotia, Canada, have invented certain new and useful Improvements in Tooth-Brushes; and I do hereby declare that the following is a full, clear, and exact description of the invention, such as will enable others skilled in the art to which it appertains to make and use the same.

My invention relates to tooth brushes; the object of my invention is to provide a tooth brush with means for preventing the flow of saliva or dentifrice to the hand of the user; a further object of my invention is to provide means for removably securing a shield to the handle of the tooth brush; a further and more specific object is to provide a brush comprising a head, a shield and a handle, with means for fastening the parts together so that either may be easily renewed; and, my invention consists of the construction, combination and arrangement of parts, as herein illustrated, described and claimed.

In the accompanying drawings, forming part of this application, I have illustrated embodiments of my invention, in which drawings similar reference characters designate corresponding parts, and in which:

Figure 1 is a side elevation of a tooth brush provided with a shield; Fig. 2 is a plan view of a head and a handle, and showing in section a shield and the method of connecting the parts, the shield being shown as a modified form of that shown in Fig. 1.

The object of my invention, more specifically stated, is to provide a sanitary tooth brush, first by providing a shield to prevent the flow of saliva from the head of the brush to the handle, and second, to provide a removable head which may be renewed after a short use.

Referring to the drawings, 1 designates the head of a brush having ordinary bristles 2, and 3 designates a handle.

Secured on or formed integral with the handle 3 adjacent the head 1, is a shield 4, which, if not formed integral with the handle, may be of any suitable material, preferably circular in shape. For the purpose of providing a removable head the head and handle are made separate. In this construction, as shown in Fig. 2, the head 1 is provided with a socket having interior screw-threads 5. The handle is provided with a non-screw-threaded reduced portion 6, the outer end of which is provided with the screw-threads 7, shoulders 8 being left on the handle. The shield is provided with a central bore 9, through which the reduced end is projected until the shoulders 8 bear upon the hub 10 formed around the bore 9, the walls of the bore 9 being disposed on the non-screw-threaded portion 6. The screw-threads 7 are then brought into engagement with the screw-threads 5 of the head, so that the shield is locked in position. In this figure, the shield 4ª is shown as cup-shaped, with its flanges extending towards the head 1.

Having thus fully described my invention, what I claim as new, and desire to secure by Letters Patent, is:—

A tooth brush comprising a head and handle separably connected, a circular shield removably secured by and between said parts, and a threaded projection on the handle adapted to pass through said shield and cooperatively engage a threaded socket in the head of the tooth brush.

In witness whereof I have hereunto set my hand in the presence of two witnesses.

LOVITT HAVELOCK CROWELL.

Witnesses:
     HOWARD D. KEMP,
     EDGAR BEAULEEN.